United States Patent [19]
Kim et al.

[11] Patent Number: 6,081,420
[45] Date of Patent: Jun. 27, 2000

[54] LCD DISPLAY APPARATUS

[75] Inventors: Tae-Sung Kim; Jin-Sang Hwang, both of Kyungki-do, Rep. of Korea

[73] Assignee: Samsung Electronics Co., Ltd., Kyungki-do, Rep. of Korea

[21] Appl. No.: 08/941,732

[22] Filed: Oct. 1, 1997

[30] Foreign Application Priority Data

Oct. 1, 1996 [KR] Rep. of Korea ...................... 96-43580

[51] Int. Cl.⁷ ..................................................... G06F 1/16
[52] U.S. Cl. ........................... 361/681; 248/284; 248/923; 248/224.61
[58] Field of Search .................................... 361/681, 682; 312/223.2; 345/905; 248/284.1, 917, 919–923, 224.61, 223.4; 364/708.1

[56] References Cited

U.S. PATENT DOCUMENTS

| | | |
|---|---|---|
| D. 313,405 | 1/1991 | Barry et al. . |
| 4,438,458 | 3/1984 | Munscher ................................. 248/917 |
| 4,669,694 | 6/1987 | Malick .................... 248/923 |
| 4,832,419 | 5/1989 | Mitchell et al. . |
| 4,834,329 | 5/1989 | Delapp ..................................... 248/923 |
| 5,107,402 | 4/1992 | Malgouries ............................. 361/681 |
| 5,206,790 | 4/1993 | Thomas et al. . |
| 5,255,214 | 10/1993 | Ma . |
| 5,268,817 | 12/1993 | Miyagawa et al. . |
| 5,329,289 | 7/1994 | Sakamoto et al. ....................... 248/922 |
| 5,503,361 | 4/1996 | Kan-O et al. . |
| 5,589,849 | 12/1996 | Ditzik . |
| 5,668,570 | 9/1997 | Ditzik ..................................... 284/923 |
| 5,812,368 | 9/1998 | Chen et al. ............................. 361/681 |
| 5,818,688 | 10/1998 | Gluskoter et al. . |
| 5,818,690 | 10/1998 | Spencer . |
| 5,828,547 | 10/1998 | Francovich et al. ................. 312/223.2 |

*Primary Examiner*—Leo P. Picard
*Assistant Examiner*—Lisa Lea-Edmonds
*Attorney, Agent, or Firm*—Robert E. Bushnell, Esq.

[57] ABSTRACT

A desktop computer includes a flat-panel display for displaying an image according to an externally supplied video signal, a mainframe chassis for supporting said flat-panel display and containing auxiliary computer equipment, a stand for connecting said mainframe chassis to said flat-panel display, and a panel adjusting device for controlling the viewing angle of said flat-panel display.

4 Claims, 5 Drawing Sheets

LCD DISPLAY APPARATUS

CLAIM OF PRIORITY

This application makes reference to, incorporates the same herein, and claims all benefits accruing under 35 U.S.C. §119 from an application for DISPLAY APPARATUS earlier filed in the Korean Industrial Property Office on Oct. 1, 1996 and there duly assigned Serial No. 43580/1996.

BACKGROUND OF THE INVENTION

1. Field of the Invention

The present invention relates to an apparatus and a process providing a variable visual display for electronic equipment such as a personal computer and, more specifically, to a process and variable visual display apparatus for promoting the effective use of desk space.

2. Discussion of Related Art

Usually, a personal computer system using a Braun tube monitor is largely divided into three is basic parts: a monitor, a keyboard and a mainframe. The monitor, which is seldom moved after being initially positioned on a user's desk, must be situated in front of the user, i.e., within eyesight, and relatively close. The keyboard, which is frequently moved, is positioned in the user's immediate work space, i.e., closer than the monitor. The mainframe, which is often remotely positioned, is very rarely moved after installation.

Since the computer's auxiliary equipment however, such as floppy disk drives, compact disk read-only memory drives and digital video device drives, is directly connected to the mainframe or internally contained inside the housing of the mainframe, the mainframe must be placed such that access to the mainframe by the user is not prohibitively inconvenient.

U.S. Design Pat. No. 313,405 for a Computer Display With Adjustable Stand to Barry et al discloses the ornamental design for a computer display with an adjustable stand. However, the computer display is not a flat panel display. U.S. Pat. No. 5,668,570 for a Desktop Computer With Adjustable Flat Panel Screen discloses a display screen position ajustable in inclination angle, aximuth angle and elevation translation movements. The support arms employed lack structural stability, however.

What is needed is a sturdy mechanism that performs adjustments to a flat panel screen of a computer so that the user can easily see the screen while having the mainframe out of the way.

SUMMARY OF THE INVENTION

Accordingly, the present invention is directed to provide an improved process and apparatus for visually displaying varying visual images generated by a computer system.

It is an object to provide a display process and apparatus that substantially obviates one or more of the limitations and disadvantages of the related art.

Another object of the present invention is to provide a display apparatus which allows a user to effectively arrange a computer system in a desk-top environment such that auxiliary equipment is conveniently accessible.

It is yet another object to provide a stable base mount for the adjustable flat panel display screen.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, there is provided a display apparatus comprising: a flat-panel display for displaying an image according to an externally supplied video signal; a chassis for supporting said flat-panel display and containing auxiliary computer equipment; a stand for connecting said chassis to said flat-panel display; and panel adjusting means for controlling the viewing angle of said flat-panel display, by movably coupling the stand unit and the flat-panel display, where the stand may or may not be detachable from the chassis. An angle control unit is provided on the bottom of the stand unit for adjusting the angle of the display apparatus to facilitate the use of the auxiliary equipment.

The present invention also provides a display apparatus as above whose stand unit supports the flat-panel display, but has means for detachably coupling to the auxiliary computer equipment. The coupling means is in the form of a tongue-and-groove fixture connected to separated stand top and bottom portions, respectively.

It is to be understood that both the foregoing general description and the following detailed description are merely exemplary and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
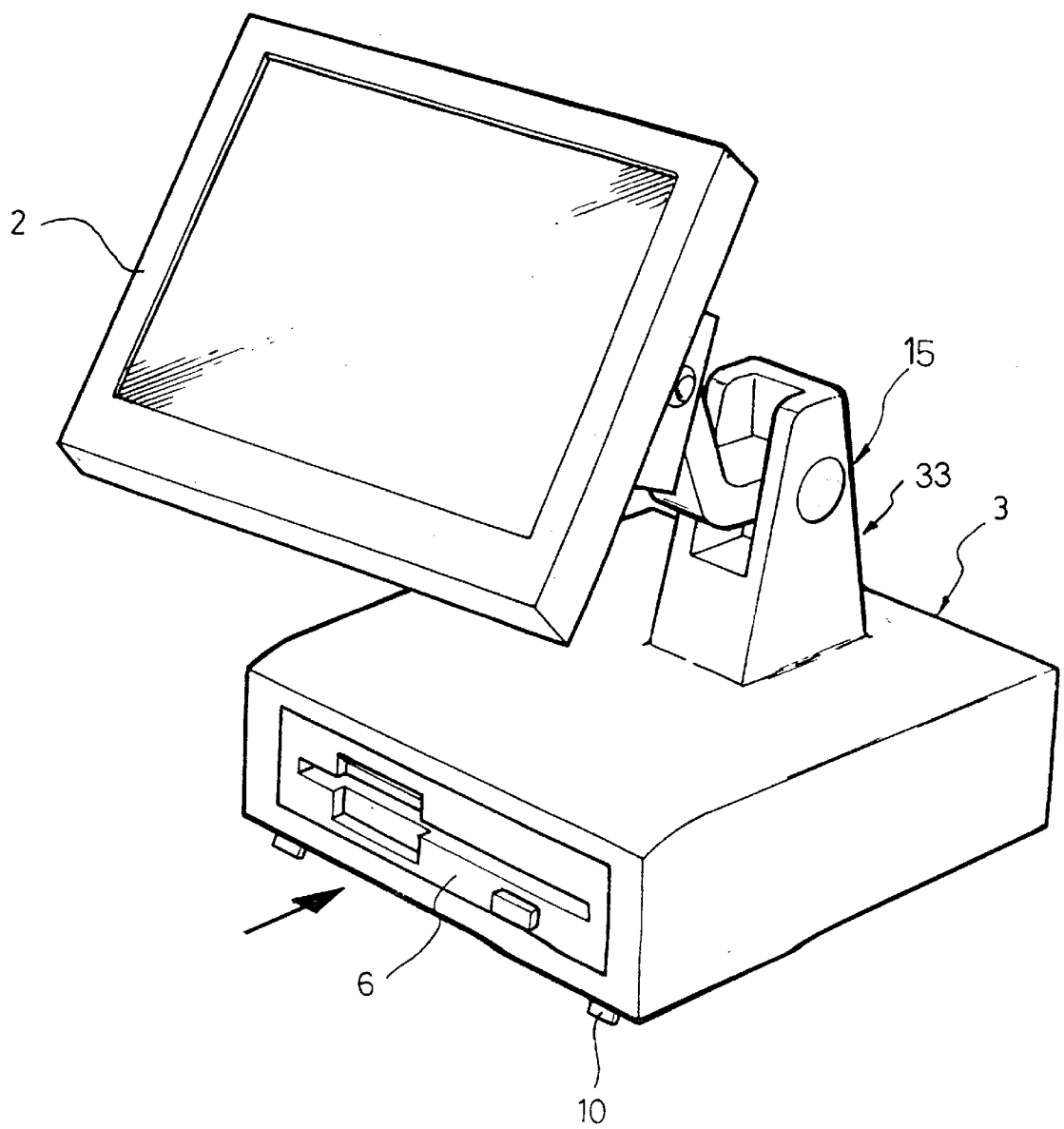
FIG. 1 is a perspective view of a display apparatus according to the present invention.
Figure 2:
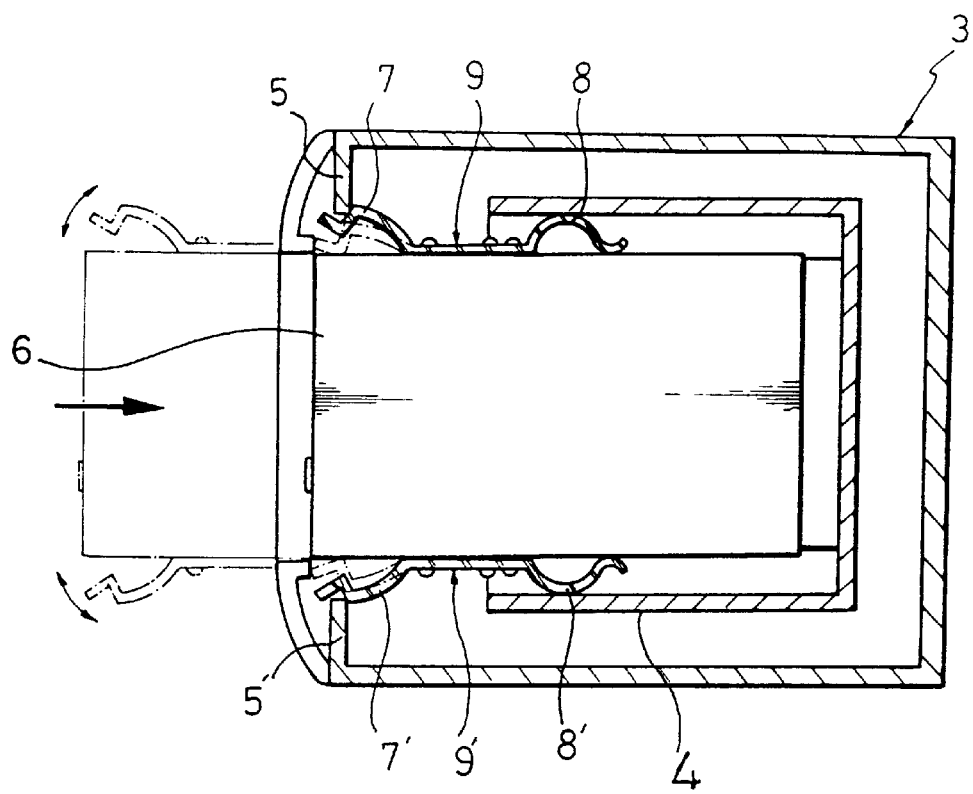
FIG. 2 is a top sectional view of the stand unit of the display apparatus according to the present invention.

Referring to FIGS. 1 and 2, the display apparatus of the present invention comprises a flat-panel display 2 which includes means (not shown) for displaying an image according to an externally supplied video signal; chassis 3 and stand unit 33 which supports the flat-panel display and houses auxiliary equipment 6 which is connected to a computer (not shown); and a panel adjustment unit 15 for adjusting the flat-panel display as desired, by hinge-coupling the flat-panel display and the stand unit. The stand unit 33 allows the flat panel display 2 to be adjusted in inclination angle, azimuth angle, and in elevation translation movements relative to the chassis 3.

The auxiliary equipment 6 is internally installed in chassis 3 which includes a container 4 for housing the auxiliary equipment. Retainers 5 and 5' are formed on either side of the front of the chassis 3, for securing the auxiliary equipment 6. Elastic fixing members 9 and 9', comprising elastic retaining portions 7 and 7' and compression portions 8 and 8', are attached to the sides of the auxiliary equipment 6, such that the auxiliary equipment can be fixedly installed in the container 4 by hand. Here, when inserting the auxiliary equipment 6 into the container 4, as shown in FIG. 2, the elastic retaining portions 7 and 7' are caught by the retainers 5 and 5', while the compression portions 8 and 8' press the inner sides of the container 4.

Figure 3:
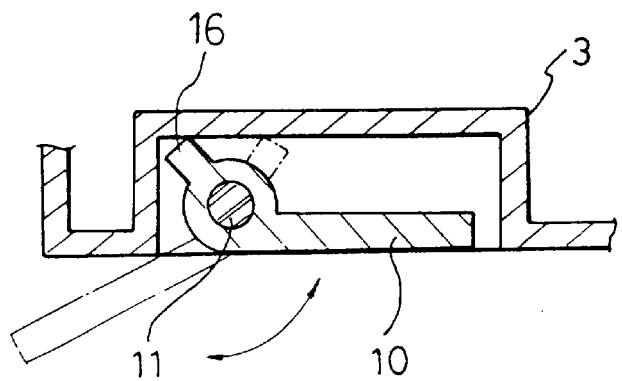
FIG. 3 is a side sectional view of the angle control unit of the display apparatus according to the present invention.
Figure 4:
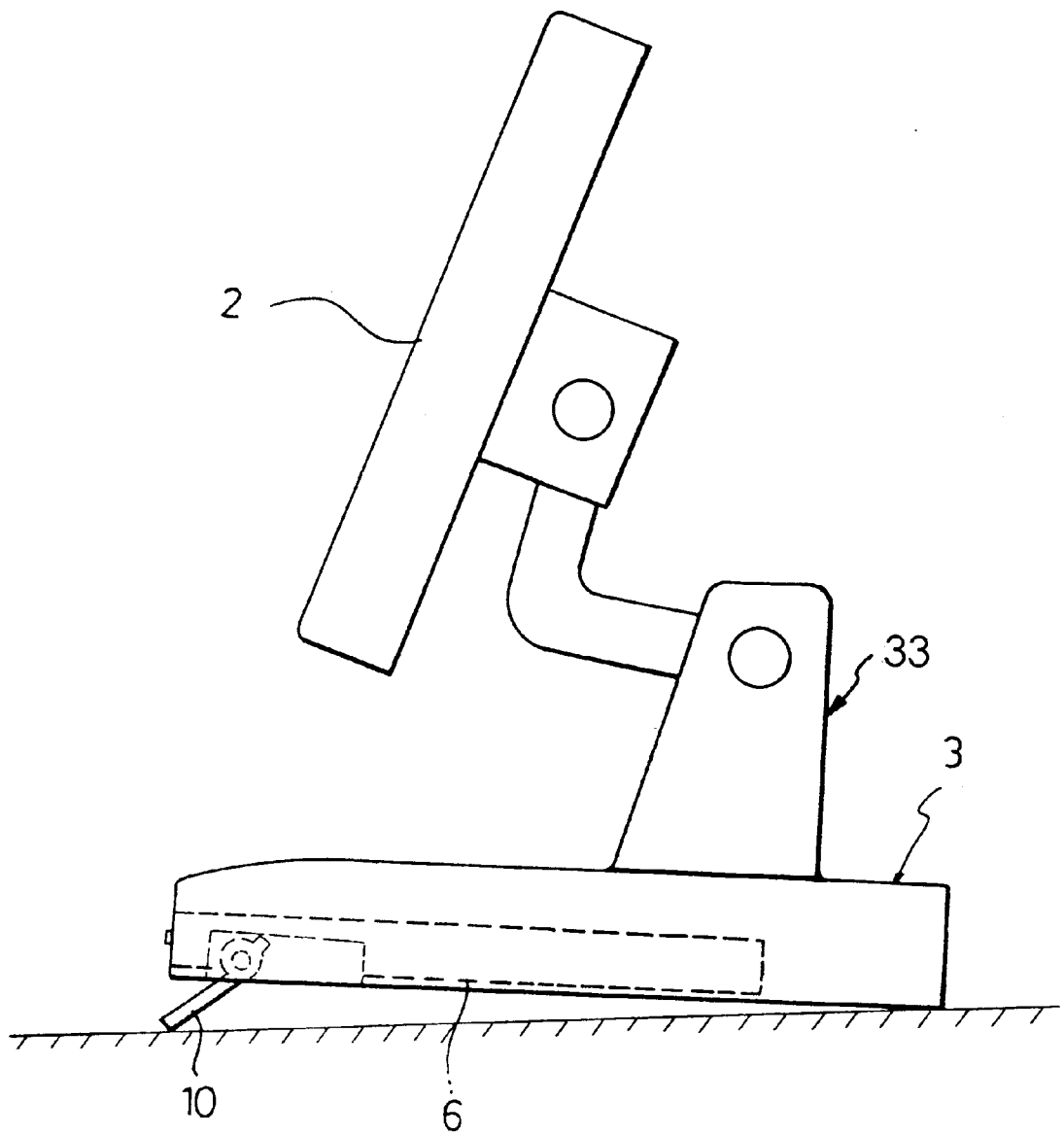
FIG. 4 is a side view of a first embodiment of the present invention.

Referring to FIGS. 3 and 4, the present invention is provided with an angle control unit for adjusting the angle of the display apparatus and allowing a user to more conveniently insert a floppy disk or CD-ROM into the auxiliary equipment 6. Here, a pair of feet 10 each having a protrusion 16 are fixed to the bottom of chassis 3 by a pair of hinge pins 11. FIG. 4 shows one embodiment of the present invention. In this embodiment, stand 33 and chassis 3 form a single integrated monolithic unit.

Figure 5:
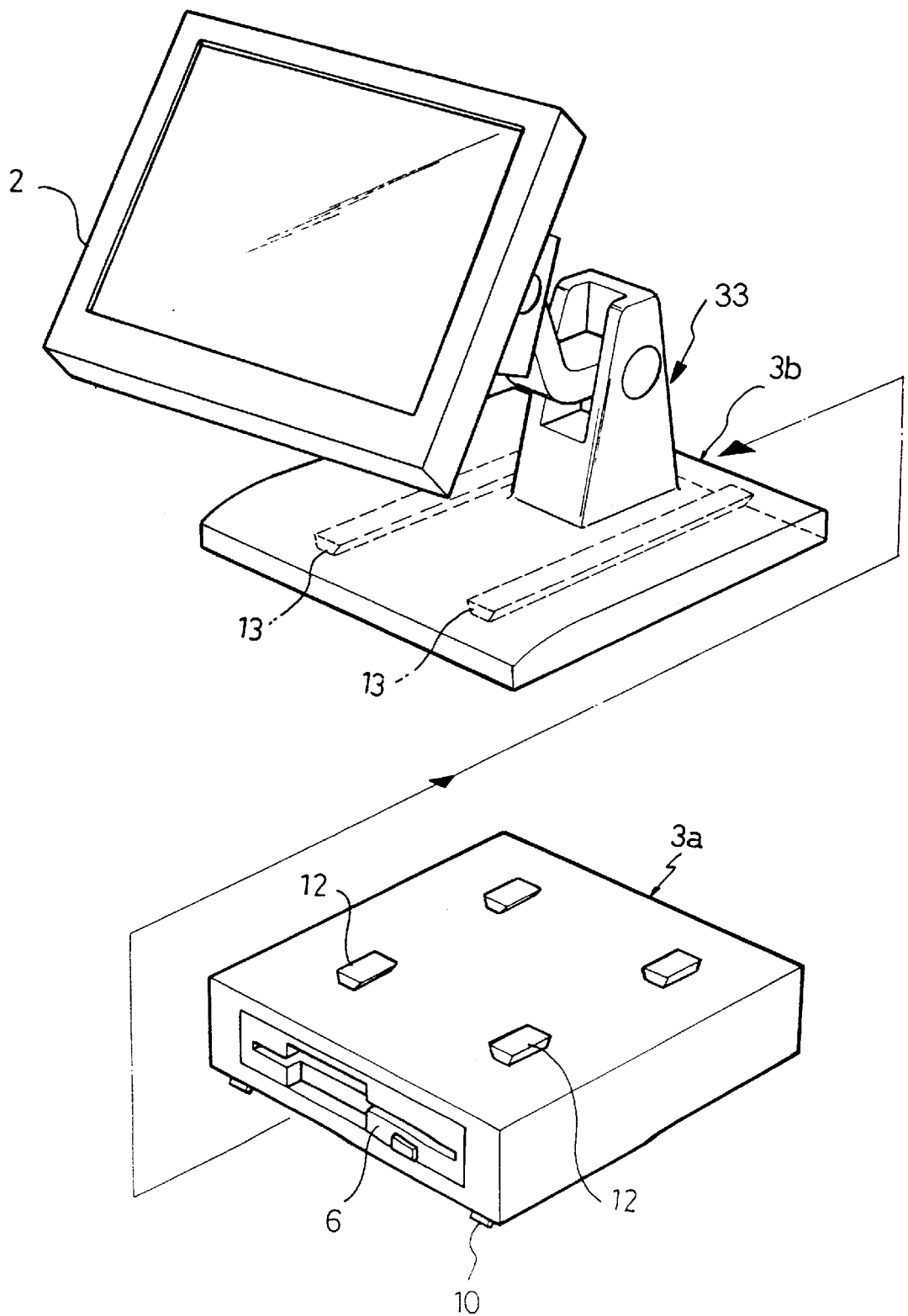
FIG. 5 is a perspective view of a second embodiment of the present invention.
Figure 6:
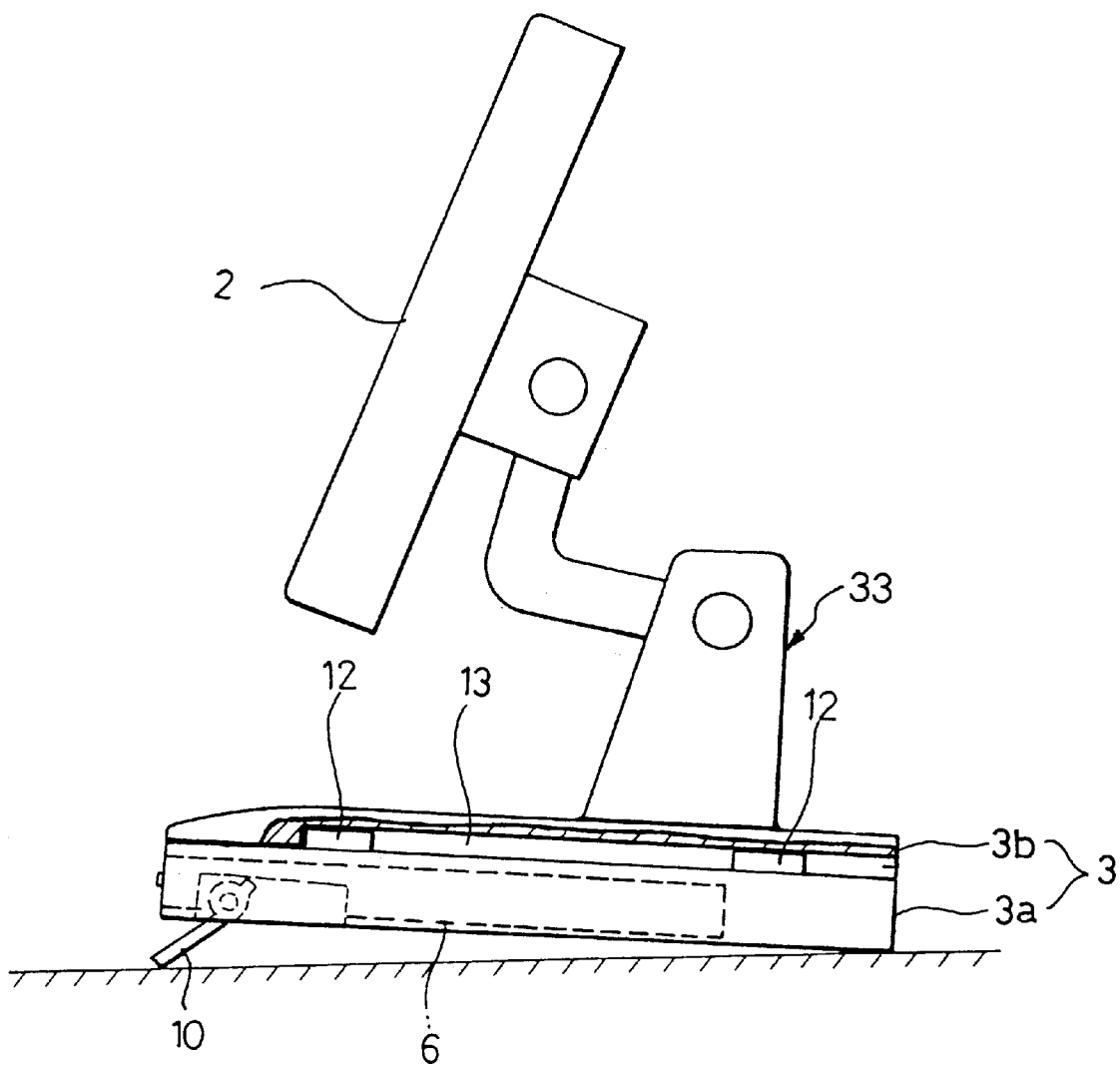
FIG. 6 is a partially cut-away side view of the display apparatus according to FIG. 5.

FIGS. 5 and 6 show another preferred embodiment of the present invention. Here, guide rails (tongues) 12 are formed on the top of a chassis 3a, and grooves 13 are formed on the bottom of chassis cover 3b. Thus, the auxiliary equipment 6 is detachably installed beneath the main body of the display apparatus. In this second embodiment, stand 33 is detachable from chassis 3a.

As described above, the present invention includes a stand unit where the main body of the display apparatus is fixed such that its viewing angle can be adjusted using a hinge. A container for containing auxiliary equipment, such as a floppy disk or CD-ROM drive, is formed within the main frame chassis. Elastic fixing members comprised of elastic retaining portions and compression portions are attached to the sides of the auxiliary equipment. Through the above configuration, the auxiliary equipment can be integrally installed in the container of the chassis, thus enabling the effectively arrangement of the system in a desk-top environment. Additionally, the auxiliary equipment can be positioned very near the user, thus enhancing user convenience.

It will be apparent to those skilled in the art that various modifications can be made in the display apparatus of the present invention, without departing from the spirit of the invention. Thus, it is intended that the present invention cover such modifications as well as variations thereof within the scope of the appended claims.

What is claimed is:

1. A display apparatus comprising:
    a flat-panel display for displaying an image according to an externally supplied video signal;
    a chassis housing an auxiliary equipment, said chassis having a top side having a plurality of guide rails;
    a chassis cover having a top side and a bottom side, said bottom side of said chassis cover having a pair of grooves for slidably engaging with said guide rails to detachably mount said chassis cover on said chassis;
    a stand unit attached to said top side of said chassis cover; and
    a panel adjusting means connecting said stand unit to said flat panel display said panel adjusting means controlling the viewing angle of said flat-panel display.

2. The display apparatus according to claim 1, wherein said plurality of guide rails being four, two guide rails for each one of said pair of grooves.

3. The display apparatus according to claim 2, wherein said chassis containing a pair of rotatable feet that allow the front portion of said chassis to become inclined relative to the back portion of said chassis.

4. The display apparatus of claim 3, wherein said chassis cover is coextensive with said top side of said chassis.

* * * * *